Nov. 18, 1969　　TETSUYA KOHYA ETAL　　3,478,818
AUTOMATIC TEMPERATURE CONTROL TYPE REFRIGERATOR
Filed May 26, 1967　　3 Sheets-Sheet 1
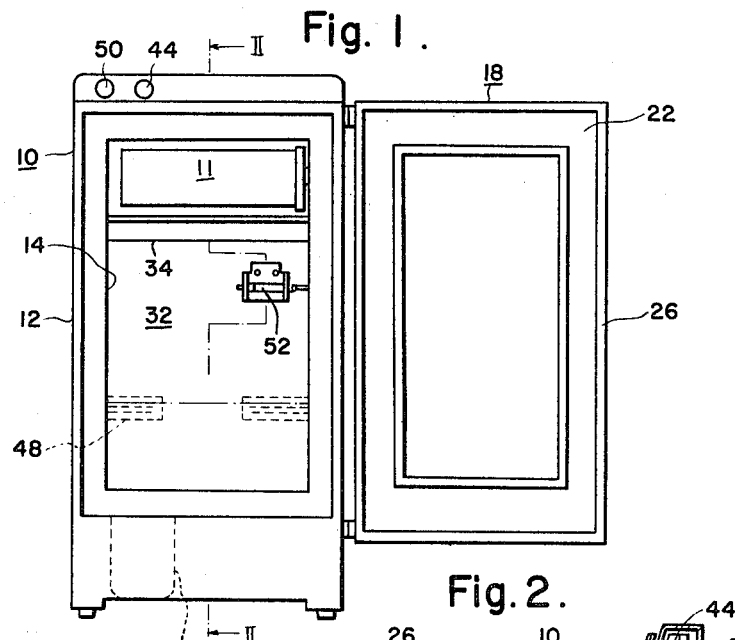
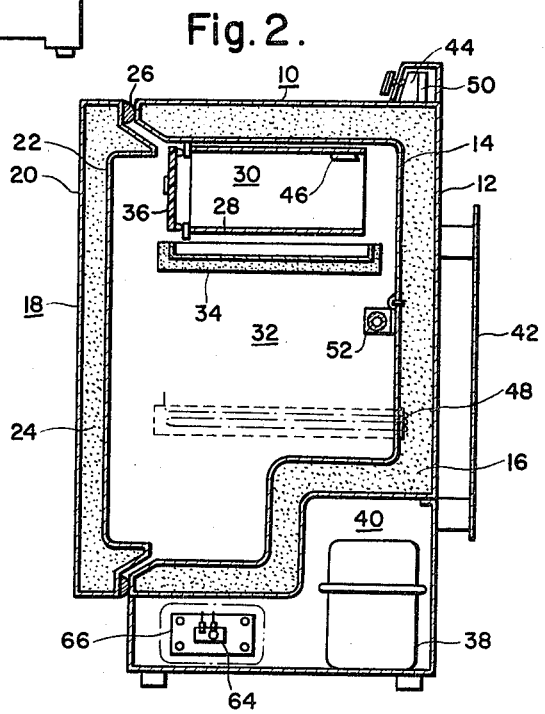

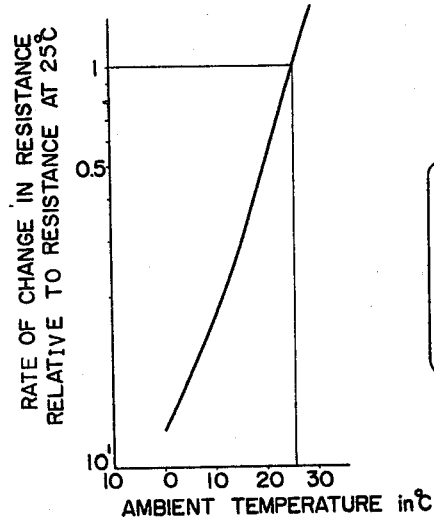
Fig. 5.
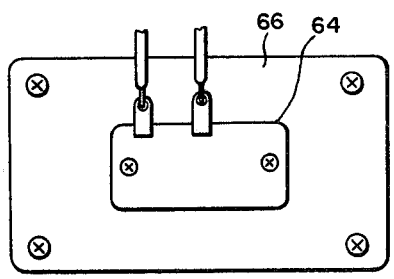
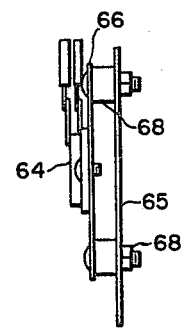
Fig. 6.
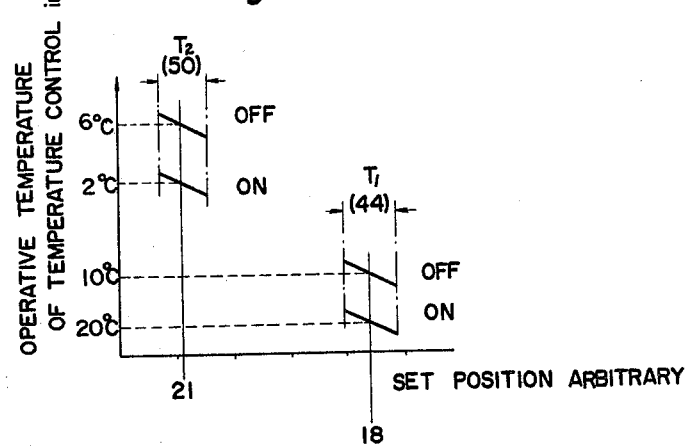
Fig. 7.

United States Patent Office 3,478,818
Patented Nov. 18, 1969

3,478,818
AUTOMATIC TEMPERATURE CONTROL TYPE REFRIGERATOR
Tetsuya Kohya and Mikio Tsuji, Shizuoka, Japan, assignors to Mitsubishi Denki Kabushiki Kaisha, Tokyo, Japan
Filed May 26, 1967, Ser. No. 641,563
Claims priority, application Japan, June 1, 1966,
41/51,326, 41/51,327
Int. Cl. F25b 29/00
U.S. Cl. 165—30       5 Claims

ABSTRACT OF THE DISCLOSURE

A temperature control of the bellows type responds to a temperature in or adjacent a vaporizer or a freezing chamber to control the operation of the associated compressor for the purpose of maintaining the freezing chamber substantially at a predetermined temperature. Another temperature control of the bellows type is electrically connected to an electric resistance heater serving to prevent a food storage chamber from being excessively cooled and responds to a temperature in the food storage chamber to control energization of the heater. Further a thermally sensitive element responsive to heat to change its internal resistance and put in the influence of the ambient temperature is connected in series to the heater to control a thermal output from the latter in response to the ambient temperature. In this way both chambers are maintained at their predetermined respective temperatures without the necessity of operating the temperature controls by the particular user each time the ambient temperature changes.

---

This invention relates generally to a refrigerator and more particularly to an automatic temperature control type refrigerator the interior of which is always at a predetermined temperature regardless of any change in ambient temperature.

Hertofore it has been commonly practiced to maintain a predetermined temperature in the interior of a refrigerator by keeping a temperature of the associated vaporizer within predetermined limits. In other words, an electric circuit for energizing a closed, motor-operated compressor has included electric contacts of a temperature control serving to sense the temperature of vaporizer. A change in temperature of the vaporizer causes closing and opening of the control contacts to energize and deenergize the circuit and therefore the compressor.

However, a temperature within a refrigerator depends not only upon a temperature of the associated vaporizer but also much upon the ambient temperature due to the thermal leakage between the refrigerator and surroundings. So far as the thermal leakage takes place, only maintaining of the vaporizer's temperature within predetermined limits has been impossible to hold the interior of the refrigerator at a predetermined temperature.

Therefore, in order to correct and maintain a temperature in the interior of a refrigerator to and at the predetermined optimum magnitude, it has been previously practiced manually to control the operative temperature of the associated temperature control each time the ambient temperature changes. This means that the associated compressor is operated for a period of time manually changed in accordance with a change in ambient temperature and that the particular user is put to a great deal of trouble. In addition, such manual operation of the temperature control has necessarily relied only upon the sixth sense of the user based upon his experience leading to the disadvantage that the temperature in the interior of the refrigerator could not be consistently corrected to and maintained at the optimum magnitude or valve.

Further in the conventional type of refrigerators including a vaporizer designed to be capable of being also used as a freezing chamber in which frozen food can be stored, maintaining of the proper temperature in the interior thereof or a chamber in which ordinary food is to be stored, through a decrease in operating time of the associated compressor by a manual operation of the temperature control has permitted the temperature in the freezing chamber to exceed a predetermined magnitude thereof. On the other hand, an increase in the operating time of the compressor to maintain the proper temperature in the freezing chamber resulted in the food storage chamber being excessively cooled.

In order to prevent such excessive cooling of the food storage chamber, there has been previously proposed the provision of an electric resistance heater associated with the food storage chamber. Such a heater has been limited in heating capability but also, by estimating a degree of excessive cooling of the food storage chamber, it has been manually preset in accordance with the ambient temperature. For these reasons, the electric resistance heater might effectively maintain the food storing and freezing chambers at their respective proper temperatures provided that the ambient temperature is, for example, down to the order of 0° C. If, however, it is desired to operate the refrigerator for storing, for example, a quantity of ice cream at an ambient temperature below 5° C., for example, the temperature in the food storage chamber will inevitably decrease below the proper magnitude due to the low capability of the resistor heater.

Also in the conventional systems for controlling temperature in a food storage chamber, the energization of an electric resistance heat involved has been controlled in conjunction with the operation of the associated compressor so that the temperature in the food storage chamber might not remain unchanged irrespective of changes in ambient conditions. In addition, a fluctuation of temperature in the food storage chamber was large because control of the energization of the heater relied upon turning on and off of the heater having a predetermined capacity.

Accordingly, it is a general object of the invention to eliminate the abovementioned disadvantages.

It is an object of the invention to provide a new and improved refrigerator capable of automatically maintaining its internal temperature at a predetermined magnitude once the particular user has set a temperature control means involved to that magnitude, regardless of any change in ambient temperature and without the necessity of manually operating the temperature control means by the user based upon his sixth sense taught by his experience each time the ambient temperature changes.

It is another object of the invention to provide, in a refrigerator of the type in which a vaporizer for cooling a food storage chamber is adapted to be capable of being used as a freezing chamber in which frozen food can be stored, improvements that in spite of any change in ambient temperature both the food storage and freezing chambers are maintained at their respective predetermined temperatures once the particular user has set the refrigerator to these temperatures.

Still another object of the invention is to provide a refrigerator of the type including a pair of vaporizers operatively connected in either series or parallel to a single compressor and providing a food storage chamber and a freezing chamber respectively, and improved such that, regardless of any change in ambient temperature, both chambers are maintained at their respective predetermined temperatures once the particular user has set the refrigerator to these temperatures.

Briefly, the invention accomplishes the above cited objects by the provision of an automatic temperature control type refrigerator including, on the one hand, a temperature control operatively coupled to a compressor and responsive to a temperature in or adjacent to a vaporizer to control the operation of the compressor, thereby to always maintain the temperature in or adjacent the vaporizer substantially at a predetermined magnitude regardless of any change in ambient temperature, and, on the other hand, an electric resistance heater operatively associated with a food storage chamber to prevent the latter from being excessively cooled and serially connected to another thermally sensitive element variable in internal resistance in accordance with the ambient temperature to control a thermal output from the heater in ressponse to the ambient temperature.

The invention will become more readily apparent from the following detailed description taken in conjunction with the accompanying drawings in which:

FIG. 1 is a front elevation view of the automatic temperature control type refrigerator embodying the principles of the invention with a front door illustrated in its open position;

FIG. 2 is a sectional view taken along section line II—II of FIG. 1 with the door illustrated in its closed position;

FIG. 5 is a graph typically illustrating the temperature-to-resistance characteristics of the thermally sensitive element shown in FIG. 3;

FIG. 6 is a view illustrating the manner in which the thermally sensitive element illustrated in FIG. 3 is mounted in the refrigerator; and FIG. 7 is a graph illustrating the operating characteristics of temperature controls illustrated in FIG. 3.

Figure 3:
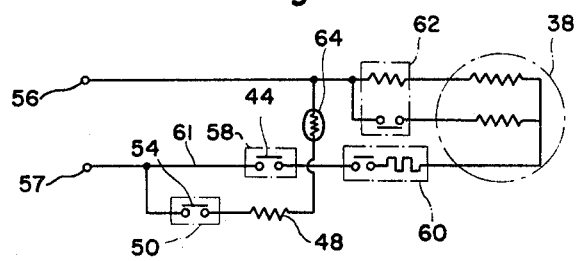
FIG. 3 is a schematic diagram of an electric circuit constructed in accordance with principles of the invention.

Referring to the drawings and FIGS. 1 and 2 in particular, there is illustrated an automatic temperature control type refrigerator constructed in accordance with the principles of the invention. An arrangement illustrated comprises a refrigerator housing unit of the conventional construction generally designated by the reference numeral 10 and including an outer housing 12 and an inner housing 14 disposed within the outer housing to form a closed space therebetween in which any suitable thermally insulating material 16 is filled. The outer and inner housings 12 and 14 respectively may be made of any suitable metallic material such as sheet steel and the thermally insulating material 16 may be, for example, glass wool. A door generally designated by the reference numeral 18 is hinged at one edge to the housing unit 10 to open and close the front opening of the latter and also includes an outer and an inner panel 20 and 22 respectively to form a closed space therebetween in which any suitable thermally insulating material 24 such as glass fiber is filled. Both panels 20 and 22 may be of the same material as the housings 12 and 14. In order to ensure that the door hermetically closes the front opening of the housing unit 10, the inner panel 22 is provided throughout the integral peripheral edge with an annular gasket 26 adapted to abut against the corresponding peripheral edge of the housing opening when the door 18 is in its closed position.

As shown in FIGS. 1 and 2, a vaporizer or evaporator 28 in the form of a rectangular cylinder is disposed on the upper portion of the inner housing 14 and its interior provides a freezing chamber generally designated by the reference numeral 30 and adapted to store frozen food therein. The remaining portion of the inner housing 14 provides a food storage chamber generally designated by the reference numeral 32 and adapted to store ordinary food therein. In order to maintain the freezing chamber 30 at a low temperature a relatively thick layer 34 of any suitable thermally insulating material is suitably disposed below the vaporizer 28 locally to heat-insulate the freezing chamber 30 from the food storage chamber 32. The layer 34 is shown in FIG. 2 as being formed of a relatively shallow dish lined with any suitable sheet metal and also serves to receive dew drops formed. Moreover, that side of the vaporizer 28 facing the door 18 is open and is normally closed by a small door 36 hinged to the same whereby the freezing chamber 30 is thermally isolated from the food storage chamber 32.

While the arrangement illustrated comprises the food storing and freezing chambers 32 and 30 respectively arranged to be cooled by the single vaporizer 28 it will be understood that the food storage chamber 32 may be provided with an auxiliary vaporizer (not shown) operatively connected in series or parallel to the vaporizer 28 for cooling purposes. In the latter case both chambers are completely isolated from each other by any suitable means and have the respective doors of any suitable thermally insulating material (not shown) in order to thermally insulate them from the surrounding air. Alternatively the vaporizer 28 may include no freezing chamber. The invention is equally applicable to such modified arrangements as will be apparent hereinafter.

All the components as above described are of the conventional design and need not be described in detail.

In order to cool the interior of the inner housing 14, a cooling system of the conventional construction is provided comprising a closed motor-operated compressor 38 disposed in a compartment generally designated by the reference numeral 40 on the lowermost portion of the housing unit 10, and a condenser 42 disposed externally of the housing unit 10 on the rear side. Any suitable refrigerant compressed at an elevated temperature by the compressor 38 passes to the condenser 42 where it is condensed. Then the condensed refrigerant flows through an ordinary device for supplying a flow of refrigerant (not shown), into the vaporizer 28 where it is vaporized to cool the interior of the inner housing 14. The vaporized refrigerant returns back to the compressor 38 in the conventional manner.

As shown in FIGS. 1 and 2 a temperature control 44 is disposed on the top wall surface of the outer housing 12 for the purpose of controlling the operation of the compressor 38. The temperature control 44 may be of the bellows type and includes a temperature sentitive element 46 in intimate contact with the surface of the vaporizer 28 to be held in heat exchange relationship with respect to the latter. The temperature control 44 is designed and constructed such that at the ambient temperature of from 30° to 40° C., for example, it functions to maintain a temperature in the freezing chamber 30 in the order of about $-15°$ C. while at the same time maintaining a temperature in the food storage chamber 32 in the order of 5° C.

Figure 4:
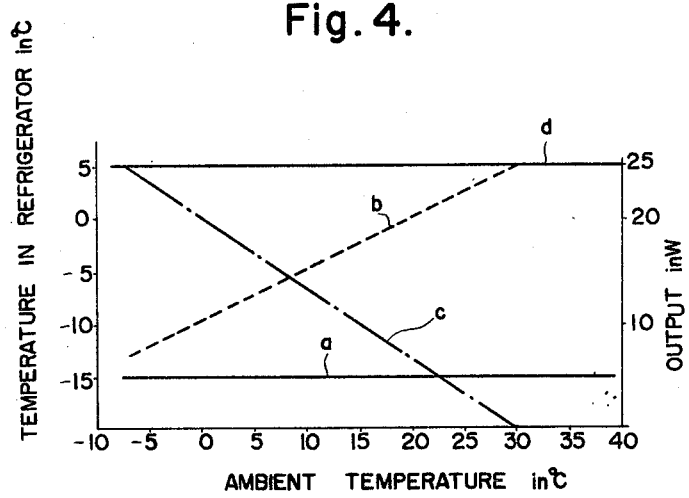
FIG. 4 is a graph plotting both the temperature characteristics of the refrigerator and the heating capability of an electric heater involved against the ambient temperature with the circuit of FIG. 3.

To this end, the temperature control 44 has the dynamic or operating characteristics such as shown on the right-hand portion labelled "$T_1$" in FIG. 7 wherein the axis of ordinates represents a temperature at which the temperature control turns "ON" or "OFF" and the axis of abscissas represent a set position of the control. Thus it will be appreciated that the temperature control 44 can be set to any position within a range of adjustment defined by a pair of vertical parallel dot-and-dash lines. For example, the temperature control 44 may be set such that it starts to operate the compressor 38 upon the temperature in the freezing chamber 30 and hence of the vaporizer 28 being raised to $-10°$ C. while it terminates the operation of the compressor 38 upon the temperature in the freezing chamber being lowered to $-20°$ C. as shown at vertical solid line in FIG. 7. Therefore, it can be said that the temperature control 44 actually controls the operation of the compressor 38 in response to the temperature in the freezing chamber 30. In the example illustrated, the range of temperature controlled by the temperature control is in the order of 20° C. This measure ensures that the temperature in freezing chamber is always maintained at a predetermined magnitude such as approximately —15° C. as shown at solid line *a* in FIG. 4 illustrating a graph plotting a temperature at which either of the chamber 30 or 32 is cooled against the ambient temperature. Solid line *a* shown in FIG. 4 indicates that the freezing chamber 30 was maintained at approximately —15° C. and free from the effect of the ambient temperature variable in a range of from about —5° C. to about +40° C.

Under these circumstances, the temperature in the food storage chamber 32 will now be considered. Assuming that the ambient temperature has decreased to a temperature out of the temperature range above specified upon setting the operative temperature of the temperature control 44, for example, to a temperature below 30° C., the food storage chamber 32 will be cooled to a temperature below its proper temperature due to the effect of the thermal leakage as previously described with the result that the excessive cooling phenomenon appears. The lower the ambient temperature the greater this degree of excessive cooling. Dotted curve *b* shown in FIG. 4 indicates by way of example the manner in which the food storage chamber of the refrigerator illustrated in FIGS. 1 and 2 varies in temperature with the ambient temperature.

In order to prevent the abovementioned excessive cooling it is necessary to properly heat the interior of the food storage chamber 32. To this end, an electric resistance heater element 48 is disposed on that side of the inner housing 14 facing the outer housing 12 and its energization is controlled by another temperature control 50 disposed side-by-side with the temperature control 44 on the top wall surface of the outer housing 12. This temperature control 50 may be also of the bellows type and has a temperature sensitive element 52 suitably mounted on the internal wall of the food storage chamber 32. The temperature control 50 associated with the food storage chamber 32 has the dynamic or operative characteristics such as shown on the lefthand portion labelled "T₂" in FIG. 7. For example, it may allow the heater element 48 to start to be energized at 2° C. to which the temperature on the chamber 32 has been lowered while it interrupts energization of the heater element at 6° C. to which the temperature in the chamber 32 has been raised as shown at vertical solid line in FIG. 7. In the example illustrated the width of temperatures controlled by the control 50 is in the order of 4° C.

In order to control the temperature in the interior of the refrigerator in the manner as above described, an electric circuit shown in FIG. 3 may be advantageously employed.

As shown in FIG. 3, a series combination of electric resistance heater element 48 and normally open contacts 54 of the temperature control 50 for the food storage chamber 32 are connected across a pair of source terminals 56 and 57. The temperature control 44 operatively associated with the compressor 38 has normally open contacts 58 connected on the one side to the terminal 57 and on the other side to one end of a compressor's motor also designated by the reference numeral 38, through an overload protective relay 60 having an operating winding and normally closed contacts serially connected to each other. The motor 38 is connected at the other end to the terminal 56 through a starting relay 62 having an operating winding connected to the field of the motor and normally open contacts connected to the armature winding of the motor. Thus it will be appreciated that the control contacts 58 for the compressor are connected in series to a control circuit 61 comprising both relays 60 and 62 to control the compressor and an auxiliary control circuit comprising the series combination 54–48–64 is connected in parallel to the said control circuit 61 including the contacts 58.

If the temperature in the freezing chamber 30 exceed a predetermined upper limit such as —10° C., the contacts 58 of the temperature control 44 are closed to energize the starting coil 62. When energized the relay 62 closes its contacts to start the compressor 38 until the temperature in the chamber 30 will decrease to a predetermined lower limit such as —20° C. whereupon the operation of the compressor terminates. Thereafter the freezing chamber 30 is allowed to increase in temperature. If the temperature in the chamber 30 reaches the upper limit then the process just described is repeated. Therefore the freezing chamber 30 is always maintained at a predetermined temperature, for example, at approximately —15° C. between —10° and —20° C. regardless of any change in ambient temperature.

Under these circumstances, the temperature in the food storage chamber 32 tends to be lower than its lower limit of the operating temperature of the temperature control 50, for example 2° C. in the case the ambient temperature is high and accordingly the thermal leakage is relatively low. This causes the contacts 54 of the temperature control 50 to be continuously closed to permit the heater element 48 to continuously generate heat with the result that the temperature in the food storage chamber 32 is corrected to reach its upper limit, in this case 6° C. above which the heater element 48 is deenergized. On the other hand, if the ambient temperature is high and therefore the thermal leakage is relatively high, the contacts 58 are similarly operated but the interval of time during which the heater element 48 is put in its energized state is reduced whereby the temperature in the chamber 32 tends to decrease to its lower limit in this case 2° C. Thus it will be appreciated that like the freezing chamber 30, the food storage chamber 32 is always maintained at a predetermined temperature such as approximately 5° C. in spite of any change in ambient temperature.

The circuit further includes a thermally sensitive or responsive element 64 put in the influence of the ambient temperature and connected in series circuit relationship to the series combination of heater element 48 and contacts 54 of the heater temperature control 50. The thermally sensitive element 64 may be, for example, of a semiconductive material having a positive coefficient of temperature of resistance such as shown in FIG. 5 wherein is shown the relationship between rate of change in resistance relative to a magnitude of resistance at 25° C. (ordinate) and the ambient temperature in ° C. (abscissa). As shown in FIGS. 2 and 6, the thermally sensitive element 64 is disposed on one wall surface 65 of the machine room 40 through a heat dissipation plate 66 and fittings 68.

If the ambient temperature decreases thereby reducing thermal leakage from the refrigerator then the heater element 48 will increase in thermal output required to control the temperature in the food storage chamber 32 by the thermally responsive element 64 having the resistance-to-temperature characteristic such as shown in FIG. 5. Thus the thermal output from the heater element 48 relative to the ambient temperature is an inverse function of the temperature in the food storage chamber 32 relative to the ambient temperature in the case the chamber 32 is under the control of the compressor 38 with its temperature not corrected by the heater element 48. This is illustrated in FIG. 4 wherein dotted curve *b* represents the temperature in the food storage chamber under the conditions just described and dotted-and-dashed curve *c* represents the thermal output in watts from the heater element. With the circuit illustrated in FIG. 3, therefore, a change in temperature within the food storage chamber as corrected by the heater element is further reduced as compared with the circuit without the thermally sensitive element 64. Thus, as shown as solid line *d* in FIG. 4, the food storage chamber was always maintained at a predetermined fixed temperature such as 5° C. regardless of the ambient temperature variable between about −5° C. and about +40° C. It is noted that the temperature control 50 is required to be operated only when the temperature in the food storage chamber should be corrected in accordance with a special change in loading of the chamber due to the opening and closing of the door 26 and the other.

In the circuit shown in FIG. 3, the heating capability of the electric resistance heater 48 may be chosened so as to just compensate for excessive cooling of the food storage chamber 32 regardless of the ambient temperature with the temperature control 50 omitted.

The invention has several advantages. For example, it eliminates the necessity of manually operating the temperature controls each time the ambient temperature changes. Nevertheless the present refrigerator can continuously maintain its internal temperature substantially at a predetermined magnitude without the ambient temperature affecting the same. Further the temperature within the refrigerator is rapidly and accurately compensated for the ingress of the ambient air due to the opening and closing operations of the refrigerator door, a decrease in cooling capability of the associated vaporizer due to its frosting, a variation in cooling load, etc.

While the invention has been illustrated and described in conjunction with a few preferred embodiments thereof it is to be understood that various changes in the details of construction and the arrangement and combination of parts may be resorted to without departing from the spirit of scope of the invention. For example, instead of the thermally sensitive element having a positive coefficient of temperature of resistance, a thermally sensitive element having a negative coefficient of temperature of resistance may be connected across the electric heater element 48.

What we claim is:

1. A refrigerator having automatic temperature control comprising: an insulated cabinet housing having a freezing compartment and a food storage compartment; a refrigerant evaporator in said freezing compartment; a refrigerant compressor and an electric drive motor connected to drive said compressor for providing in operation refrigerant to said evaporator; a motor control circuit connected to control said electric drive motor; first settable, temperature sensing means connected in said motor control circuit for detecting and directly controlling the temperature of said freezing compartment; an auxiliary control circuit connected in parallel with said motor control circuit for detecting and controlling the temperature of said food storage compartment independently of the control of said freezing compartment; said auxiliary control circuit including means for electrically heating said food storage compartment, second settable, temperature sensing means for detecting the temperature within said food storage compartment and energizing said heating means whenever the temperature within said food storage compartment falls below a preset value, and third temperature sensing means located outside said cabinet housing for continuously regulating the heat output of said heating means in response to ambient temperature changes; whereby said auxiliary control circuit continuously controls the temperature of the food storage compartment independently of the temperature of the freezing compartment and in accordance with the ambient temperature.

2. A refrigerator as in claim 1, wherein said third temperature sensing means comprises a temperature responsive semiconductor element.

3. A refrigerator as in claim 1, wherein said third temperature sensing means has a positive temperature coefficient.

4. A refrigerator as in claim 1, wherein said heating means, said second temperature sensing means, and said third temperature sensing means are all electrically connected in series.

5. A refrigerator as in claim 1, wherein said second settable, temperature sensing means comprises means settable to maintain the temperature within the food storage compartment bewean 2° C. and 6° C.

References Cited
UNITED STATES PATENTS

| | | | |
|---|---|---|---|
| 2,488,161 | 11/1949 | Benson e al. | 165—30 XR |
| 2,724,577 | 11/1955 | Murphy | 165—30 |
| 2,780,441 | 2/1957 | Rhodes | 165—30 XR |
| 3,131,545 | 5/1964 | Gross et al. | |

FRED C. MATTERN, JR., Primary Examiner

M. ANTONAKAS, Assistant Examiner